(12) United States Patent
Pernot et al.

(10) Patent No.: US 10,454,384 B2
(45) Date of Patent: Oct. 22, 2019

(54) SWITCHING POWER SUPPLY WITH CONTROLLED TRANSISTOR BRIDGE

(71) Applicant: DEVIALET, Paris (FR)

(72) Inventors: Mathieu Pernot, Juvisy-sur-Orge (FR); Alexandre Huffenus, Grenoble (FR); Pierre-Emmanuel Calmel, Le Chesnay (FR)

(73) Assignee: DEVIALET, Paris (FR)

( * ) Notice: Subject to any disclaimer, the term of this patent is extended or adjusted under 35 U.S.C. 154(b) by 0 days.

(21) Appl. No.: 15/552,038

(22) PCT Filed: Feb. 19, 2016

(86) PCT No.: PCT/EP2016/053605
§ 371 (c)(1),
(2) Date: Aug. 18, 2017

(87) PCT Pub. No.: WO2016/131980
PCT Pub. Date: Aug. 25, 2016

(65) Prior Publication Data
US 2018/0041113 A1 Feb. 8, 2018

(30) Foreign Application Priority Data

Feb. 20, 2015 (FR) ...................................... 15 51470

(51) Int. Cl.
*H02M 3/335* (2006.01)
*H02M 1/38* (2007.01)
(Continued)

(52) U.S. Cl.
CPC ....... *H02M 3/33592* (2013.01); *H02M 1/088* (2013.01); *H02M 1/38* (2013.01);
(Continued)

(58) Field of Classification Search
CPC .... H02M 1/38; H02M 3/33507; H02M 1/088; H02M 2001/0048
(Continued)

(56) References Cited

U.S. PATENT DOCUMENTS 4,967,332 A * 10/1990 Claydon ................. H02M 1/38
363/132
5,929,665 A * 7/1999 Ichikawa ................ H01L 29/00
327/109

(Continued)

OTHER PUBLICATIONS

International Search Report dated Jun. 8, 2016 in PCT/EP2016/053605.

(Continued)

*Primary Examiner* — Yusef A Ahmed
(74) *Attorney, Agent, or Firm* — B. Aaron Schulman, Esq.; Stites & Harbison, PLLC.

(57) ABSTRACT

A switching power supply is provided which includes an input for an input current at an input voltage, a controlled transistor bridge having two branches each with two transistors, the two branches being connected in parallel to the input terminals, a transformer having a primary connected between the midpoints of the two branches formed between the transistors of each branch, an output for an output current connected to the terminals of a secondary circuit of the transformer, and a control unit for the transistors to alternately switch each of the midpoints between high and low values with a time offset between the switching times of the midpoint values. The control unit is also capable of ensuring that the time order for switching of the midpoints between the high and low values thereof varies over the course of time.

6 Claims, 2 Drawing Sheets

Figure 1:
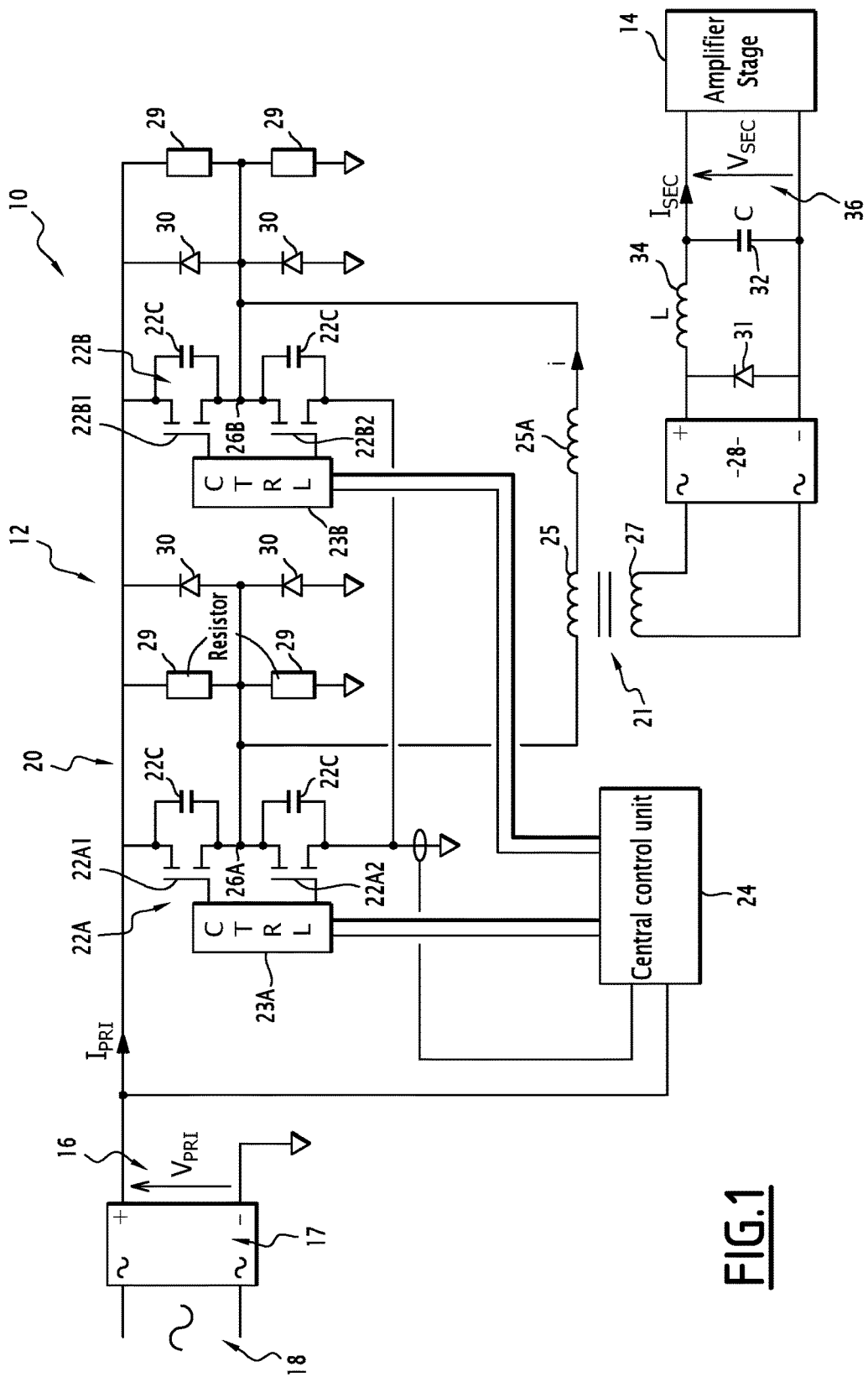

(51) Int. Cl.
*H02M 1/088* (2006.01)
*H02M 7/217* (2006.01)
*H02M 1/00* (2006.01)

(52) U.S. Cl.
CPC .... *H02M 7/217* (2013.01); *H02M 2001/0048* (2013.01); *Y02B 70/1475* (2013.01); *Y02B 70/1491* (2013.01)

(58) Field of Classification Search
USPC .......................................... 363/17, 56.04, 98
See application file for complete search history.

(56) References Cited

U.S. PATENT DOCUMENTS

| | | | | |
|---|---|---|---|---|
| 5,963,436 A * | 10/1999 | Yoshida | H02M 3/3376 | 363/132 |
| 6,246,594 B1 * | 6/2001 | Matsuda | H02M 3/33592 | 363/17 |
| 7,092,269 B1 * | 8/2006 | Westberg | H02M 7/53871 | 363/132 |
| 7,545,212 B2 | 6/2009 | Calmel et al. | | |
| 8,385,092 B1 * | 2/2013 | Shekhawat | H02M 1/38 | 363/132 |
| 9,190,928 B2 | 11/2015 | Calmel et al. | | |
| 9,570,991 B2 * | 2/2017 | Akutagawa | H02M 3/33584 | |
| 2002/0001203 A1 * | 1/2002 | Jitaru | H02M 3/3376 | 363/17 |
| 2002/0126517 A1 * | 9/2002 | Matsukawa | H02M 3/33569 | 363/69 |
| 2004/0136209 A1 * | 7/2004 | Hosokawa | H02M 3/33592 | 363/24 |
| 2004/0257837 A1 * | 12/2004 | Xu | H02M 3/33592 | 363/21.04 |
| 2006/0221648 A1 * | 10/2006 | Liu | H02M 7/53871 | 363/17 |
| 2007/0025125 A1 * | 2/2007 | Nakahori | H02M 1/32 | 363/56.02 |
| 2008/0088375 A1 | 4/2008 | Calmal et al. | | |
| 2010/0232180 A1 * | 9/2010 | Sase | H02M 3/33576 | 363/17 |
| 2011/0058399 A1 * | 3/2011 | Honsberg | H02M 7/487 | 363/98 |
| 2011/0063883 A1 * | 3/2011 | Hattori | H02M 7/53873 | 363/148 |
| 2011/0101951 A1 * | 5/2011 | Zhang | H02M 3/33592 | 323/305 |
| 2011/0103097 A1 * | 5/2011 | Wang | H02M 3/33592 | 363/17 |
| 2011/0188275 A1 * | 8/2011 | Mino | H02M 1/36 | 363/49 |
| 2011/0194206 A1 * | 8/2011 | Sase | H02M 3/33592 | 360/75 |
| 2013/0069733 A1 * | 3/2013 | Calmel | H02M 7/217 | 331/185 |
| 2013/0336014 A1 * | 12/2013 | Kinjou | H02M 3/33507 | 363/21.01 |
| 2014/0140106 A1 * | 5/2014 | Duan | H02M 3/33592 | 363/21.06 |
| 2014/0192560 A1 * | 7/2014 | Ou | H02M 1/40 | 363/16 |
| 2014/0226369 A1 * | 8/2014 | Kimura | H02M 3/3376 | 363/21.09 |
| 2014/0254203 A1 * | 9/2014 | Dai | H02M 3/3353 | 363/17 |
| 2014/0376269 A1 * | 12/2014 | Johnson | H02M 3/33507 | 363/17 |
| 2015/0092450 A1 * | 4/2015 | Feno | H02M 3/33592 | 363/17 |
| 2015/0098250 A1 * | 4/2015 | Wu | H02M 3/33507 | 363/17 |
| 2015/0138841 A1 * | 5/2015 | Pahlevaninezhad | H02J 3/383 | 363/17 |
| 2015/0138844 A1 * | 5/2015 | Karlsson | H02M 3/158 | 363/21.1 |
| 2015/0207424 A1 * | 7/2015 | Okamoto | H02M 3/33569 | 363/17 |
| 2015/0229225 A1 * | 8/2015 | Jang | H02M 3/285 | 363/17 |
| 2015/0244279 A1 * | 8/2015 | Takagi | H02M 3/33584 | 363/17 |
| 2015/0263646 A1 * | 9/2015 | Hara | B60L 3/003 | 363/17 |
| 2015/0365005 A1 * | 12/2015 | Panov | H02M 3/33584 | 307/24 |
| 2015/0381063 A1 * | 12/2015 | Takahara | H02M 3/3376 | 363/17 |
| 2016/0105119 A1 * | 4/2016 | Akamatsu | H02M 7/4807 | 363/21.04 |
| 2016/0111964 A1 * | 4/2016 | Oki | H02M 3/3378 | 363/21.02 |
| 2016/0141972 A1 * | 5/2016 | Yamada | H02M 1/32 | 363/37 |
| 2016/0149502 A1 * | 5/2016 | Kidera | H02M 3/33584 | 363/21.06 |
| 2016/0156272 A1 * | 6/2016 | Miura | H02M 3/33561 | 363/17 |
| 2016/0156274 A1 * | 6/2016 | Miura | H02M 3/33561 | 363/17 |
| 2016/0303987 A1 * | 10/2016 | Kawamura | B60L 11/1812 | |
| 2016/0329822 A1 * | 11/2016 | Sanchez | H02M 3/33569 | |
| 2017/0302194 A1 * | 10/2017 | Zhang | H02M 7/219 | |

OTHER PUBLICATIONS

Written Opinion dated Jun. 8, 2016 in PCT/EP2016/053605.
French Search Report from FR 15 51470, dated Jan. 5, 2016.

* cited by examiner

SWITCHING POWER SUPPLY WITH CONTROLLED TRANSISTOR BRIDGE

The invention relates to a switching power supply comprising:
an input for an input current at an input voltage;
a controlled transistor bridge comprising two branches each comprising two transistors connected in series, the two branches being connected in parallel to the input terminals;
a transformer whose primary is connected between the midpoints of the two branches formed between the series-connected transistors of each branch;
an output for an output current connected to the terminals of a secondary circuit of the transformer; and
a control unit for the transistors to switch each of the midpoints, in an alternating manner, between high and low values with a time offset between the time instants of switching of the midpoint values.

Many electronic devices are supplied with power from the public power grid distributing a periodic sinusoidal voltage across a switching power supply that is capable of providing a direct current DC supply voltage. Such is the case for example of high-fidelity amplifiers and laptops during the recharging thereof.

The transistors used in the switching arms of the switching power supply intrinsically comprise a parasitic capacitance between the drain and the source of each transistor. These capacitances are charged and discharged during each switching leading to a significant level of energy dissipation It is a known practice, in order to avoid excessive heating, to provide between the two midpoints of the two branches, an inductance connected in series with the winding of the primary of the transformer in order to enable a periodic exchange of energy between the parasitic capacitors of the transistors and this inductance.

In addition, it is a known practice to provide for a dead time between the time instants of switching of the two transistors of the same branch in order to avoid the phenomenon of simultaneous conduction. It is during this dead time that the exchange of energy takes place between the parasitic capacitors and the inductance, limiting the phenomenon of "hard-switching" of the transistors.

These mechanisms serve the purpose of reducing the heating which nevertheless remains very high, in particular when the switching power supply is used to power an audio amplifier, since in this case the energy provided by the power supply varies frequently and very rapidly from to one cycle to another.

The objective of the invention is to provide the means to further reduce the local heating of the switching power supply, thereby increasing its power for the identical switching transistors.

To this end, the object of the invention relates to a switching power supply of the aforementioned type, characterized in that the control unit is capable of ensuring that the time order for switching of the midpoints between the high and low values thereof varies over the course of time.

According to some particular embodiments, the switching power supply comprises one or more of the following characteristic features:
the time order for switching of the midpoints is maintained for the same number of switches of the two midpoints before each reversal of the switching time order;
the control unit is capable of ensuring that the time order for switching varies for each period of the periodic power supply signal;
the control unit is capable of ensuring that the two transistors of the same branch are switched with a dead time separating the switching times of the two transistors of the same branch for the switching of the midpoint between the high and low values thereof and the dead times applied during the same switching on the two branches are different;
the dead times of each branch are dependent on the time order of switching of the two midpoints;
the said power supply comprises a rectifying circuit connected between the terminals of the secondary circuit of the transformer and the output.

The object of the invention also relates to an amplifier that comprises an amplification stage and a switching power supply as defined here above.

Figure 2:
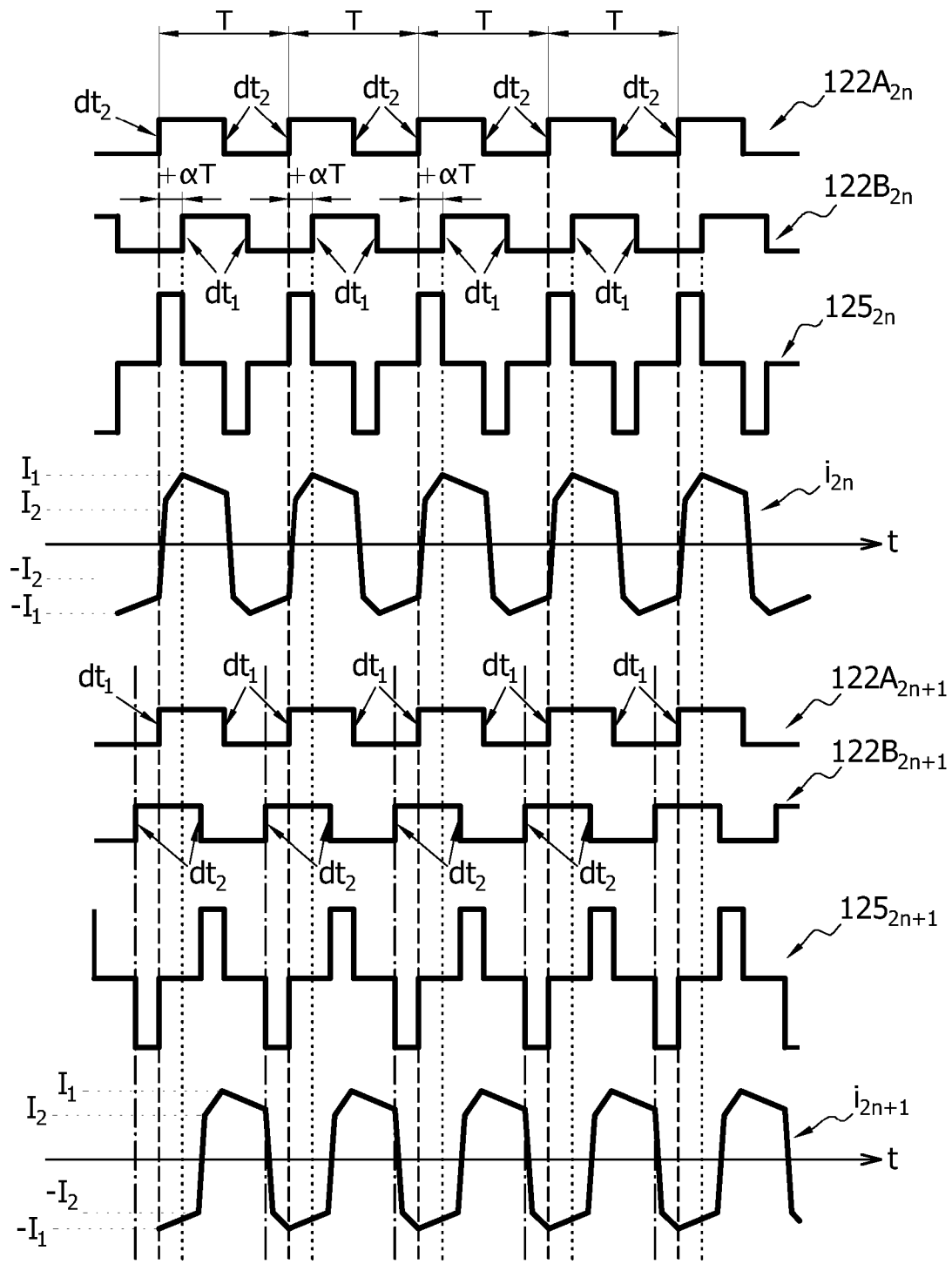

The invention will be better understood upon reading the description which follows, provided purely by way of example and with reference made to the drawings in which:

FIG. 1 is a schematic circuit of the switching power supply according to the invention integrated into an amplifier; and FIG. 2 is a block circuit diagram of the control mode for controlling the switches effectively implemented in the power supply illustrated in FIG. 1 and its consequential effects on the intensity of the current i flowing in the primary of the transformer.

Illustrated in FIG. 1 is a high fidelity amplifier 10 that comprises a switching power supply 12 which powers an amplifier stage 14. The amplifier stage 14 is of any suitable type and is described for example in the patent application FR 2 873.872.

The switching power supply 12 has an input 16 that is suitable for being connected to the output of a diode rectifier bridge 17 supplied with power from a power supply grid 18 providing a sinusoidal voltage for example of 230 V at a frequency of 50 or 60 Hz.

For the switching power supply, the input voltage is denoted as $V_{PRI}$ and the current intensity flowing through the input 16 is denoted as $I_{PRI}$. The period of the voltage Vpri is denoted as $T_{in}$.

The input 16 is connected directly, without interposition of a boost type circuit at the input of a transistor bridge 20 whose output is connected to a transformer 21.

As is known per se, the transistor bridge 20 comprises two parallel branches 22A, 22B each comprising two controlled transistors connected in series 22A1, 22A2 and 22B1, 22b2 respectively.

The two branches 22A, 22B are connected between the two terminals of the input 16, one of which forms the ground. The connecting points of the transistors of the same branch constitute the output of the transistor bridge.

Each of the transistors is constituted for example of a MOS type (metal oxide semiconductor) transistor, and these transistors are controlled by a control circuit 23A, 23B that is specific to each branch 22A, 22B, which is itself connected to a central control unit 24 together forming one control unit.

Each transistor 22A1, 22A2, 22B1, 22b2 is constructed to comprise a parasitic capacitance 22C illustrated in FIG. 1 that is connected between the drain and the source thereof.

The transformer 21 comprises a primary circuit 25 connected between the two midpoints 26A, 26B of the branches 22A, 22B through an inductance 25A. These midpoints are located between the two transistors connected in series in each branch 22A, 22B.

The secondary circuit 27 of the transformer is connected to the input terminals of a rectifying circuit 28 formed for example by a diode bridge that is known per se.

The midpoints 26A, 26B are each connected to the two input terminals 16, by a resistor 29 of high value for example equal to 1 MΩ and a diode 30. Thus, the resistor and the diode are connected in parallel relative to the transistor between the drain and the source thereof.

The diode is formed either by a discrete added component or by the diode formed by being built-in within the MOS transistor as is known per se. These diodes are capable of ensuring that the voltage between the drain and the source does not exceed a reference voltage.

A diode 31 is connected between the two output terminals of the diode bridge 28.

The output of the diode bridge 28 is also connected to a storage capacitor 32 through an inductance 34. This inductance is disposed between the cathode of the diode 31 and one of the terminals of the capacitor 32. The output denoted as 36 of the switching power supply is formed at the terminals of the capacitor 32.

The current measurement means for measuring the input current intensity $I_{PRI}$ and the total current intensity flowing in the switching branches 22A, 22B are provided and connected to the central control unit 24. They are each formed respectively for example, by a resistor at the terminals of which the voltage is measured, this voltage being proportional to the current intensity circulating in the resistor.

The control unit 24, 23A, 23B is capable of ensuring the switching of the transistor bridge with a fixed frequency of period T, typically comprised between 20 kHz and 500 kHz. The switching of the bridge is interrupted when $V_{pri}$ approaches 0 as is described in the document WO2011/114007.

The switching of the transistors on the branches 22A or 22B is controlled in a manner such that the switching order from a low value to a high value of the two midpoints 26A, 26B varies periodically over the course of time at a frequency that is smaller than the switching frequency T of the transistors of the branches 22A, 22B, and in particular from a period $T_{in}$ to the subsequent period.

Thus, the switching of the midpoints 26A, 26B follows a first law during the even-order periods $T_{in}$ and a different second law during the odd order periods.

FIG. 2 illustrates the form of the voltages and current at various different points of the circuit in the upper half of the figure for the even periods $T_{in}$ and in the lower half of the figure for the odd periods $T_{in}$.

The two curves $122A_{2n}$, $122B_{2n}$ and $122A_{2n+1}$, $122B_{2n+1}$ respectively in FIG. 2 represent the voltage at the midpoints 26A, 26B and the third curve $125_{2n}$, respectively $125_{2n+1}$ represents the potential difference at the terminals of the primary 25 of the transformer for the respectively even and odd periods $T_{in}$.

The midpoints 26A, 26B are switched, during the switching of the transistors of the branch considered, between the ground (low voltage denoted by 0) and $V_{pri}$ (high voltage denoted by 1).

The control is such that at the midpoint 26A, the voltage is high during a half period T/2 and low during a half period T/2, which occurs in a regular manner. Under the effect of the control, the midpoint 26B switches between the two same values as the midpoint 26A in a temporally offset manner in relation to the switching of the voltage at the midpoint 26A with a time lag or a lead denoted as ±αT, a being strictly comprised between 0 and 1. The duration of holding of the signal at the point 26B in the high state is identical for the midpoints 26A and 26B and is equal to the half period T/2.

The table that follows indicates by the midpoints 26A and 26B, for each even-order or odd-order period $T_{in}$ of the input voltage Vpri the time instant for switching from the low state (denoted as 0) to the high state (denoted as 1) and the time instant of switching from the high state to the low state.

TABLE 1

| Direction of Switching: | Even Period $T_{in}$ | | Odd Period $T_{in}$ | |
|---|---|---|---|---|
| | Switching time Instant | Dead time | Switching time Instant | Dead time |
| for 25A | | | | |
| 0 to 1 | nT | dt2 | nT | dt1 |
| 1 to 0 | (n + ½)T | dt2 | (n + ½)T | dt1 |
| for 25B | | | | |
| 0 to 1 | (n + α)T | dt1 | (n − α)T | dt2 |
| 1 to 0 | (n + ½ + α)T | dt1 | (n + ½ − α)T | dt2 |

For all the even periods $T_{in}$ of the input voltage $V_{pri}$, the switches to the high state and to the low state of the midpoint 26B are lagging behind the switch to the same state of the midpoint 26A, by a time lag αT, this being so for all the switching cycles n where integer n is comprised between 0 and $T_{in}/T$.

In contrast, for the odd periods $T_{in}$ of the input voltage $V_{pri}$, the switches from the low state to the high state and from the high state to the low state of the midpoint 26B are in advance of the corresponding switches of the midpoint 26A by a lead equal to −αT.

This time offset ±αT and this reversal of the order of switching times of the midpoints 26A and 26B are illustrated in FIG. 2 where it is noted over the first period corresponding to the even order periods $T_{in}$, that the midpoint 26B switches to the high value with a time lag equal to αT relative to the switch to the high value of the midpoint 26A. It is similarly the case for the switch to the low value.

By contrast, in the odd order periods $T_{in}$, the switching to the high value and the low value of the midpoint 26B is carried out with a lead of −αT relative to the switching of the midpoint 26A.

Illustrated on the fourth curve $i_{2n}$, respectively $i_{2n+1}$, is the value of the current i flowing in the primary circuit 25 and therefore in the transistor to be switched during the respectively even and odd periods $T_{in}$. It is noted on these curves that, the current intensity flowing in the switching branch switching with a time lag is greater in absolute value than the current intensity flowing in the branch that has a lead at the switching time since it is equal to I1 versus I2 with I1>I2 by application of a constant voltage at the terminals of the transformer 25 and the inductance 25A.

By alternating the order of switching of the switching branches from a period $T_{in}$ over the other period, the two branches are subject to the same average current intensity during the switching of transistors since they are subjected once to the current intensity I1 and once to the current intensity I2.

Under these conditions, the two branches which undergo an identical degree of heating, which heating is less than the heating that a switching branch would have undergone if it had always been switched with a time lag in relation to the other branch as is the case in the state of the art.

Thus, this makes it possible to obtain a better thermal distribution between the two branches and thereby enables optimization of the system.

In addition, the control of the transistors is such that, during the switching on each branch, the two transistors of the same branch are switched with a qualified elementary offset of down time and known by the expression "dead time" ensuring that the voltage between drain and source of a transistor is minimized when it is switched from the off state to the on state thereof.

As indicated in table 1, the elementary time lags indicated dt1, dt2 are different according to whether the midpoint 26A, 26B of the branch is the first or second to be switched.

Thus, when the midpoint is switched earlier, an elementary time lag dt2 corresponding to the current intensity I2 is applied whereas when the mid-point is switched later, an elementary time lag dt1 corresponding to the current I1 is applied.

Thus, alternately in each period $T_{in}$, an elementary time lag dt1 or dt2 is applied.

The values of the time lags dt1 and dt2 are different because the currents flowing in the transistors and therefore the rates of charge/discharge of the capacitors are different. In particular, dt1 is less than dt2 since it is applied while the current intensity I1 (in absolute value) of the current flowing in the primary of the transformer and thus in the conduction transistors is greater than I2 (in absolute value).

These elementary time lags are reiterated on the curves of FIG. 2, although the slightly offset switching times of the transistors are not shown in this figure where only the switching of the voltage in a macroscopic manner is represented for each midpoint 26A, 26B.

In the example described herein, the period $T_{in}$ of switching of the order of commands between the two branches is equal to the period of the power supply grid. By way of a variant, this period is independent of that of the power supply grid.

The invention claimed is:

1. A switching power supply comprising:
   an input for an input current at an input voltage;
   a controlled transistor bridge comprising a first branch and a second branch, each branch comprising two transistors connected in series, said first and second branches being connected in parallel to input terminals, the first branch comprising a first midpoint formed between the series-connected transistors of the first branch, the second branch comprising a second midpoint formed between the series-connected transistors of the second branch;
   a transformer comprising a primary circuit and a secondary circuit, the primary circuit being connected between the first midpoint and the second midpoint;
   an output for an output current connected to terminals of the secondary circuit of the transformer; and
   a control unit for the transistors of the controlled transistor bridge, the control unit being capable of ensuring switching of the transistor bridge with a fixed frequency corresponding to a switching cycle such that during each switching cycle:
      there is a high voltage of the first midpoint during a half period of the switching cycle and a low voltage during the other half period of the switching cycle, and
      the second midpoint is switched between the two same high and low voltages than the first midpoint, with a time offset with respect to a switching moment of the corresponding voltage of the first midpoint,
   wherein the control unit is capable of ensuring that a time order for switching of the midpoints between the high and low voltages thereof varies over the course of time at a frequency which is smaller than the switching frequency of the transistor bridge so that the time for switching the second midpoint between the two same high and low voltages of the first midpoint over a first period is alternately:
      in advance of the switching moment of the corresponding voltage of the first midpoint, and
      delayed from the switching moment of the corresponding voltage of the first midpoint.

2. The power supply according to claim 1, wherein the time order for switching of the midpoints is maintained for a same number of switching moments of the two midpoints before a reversal of the switching time order.

3. The power supply according to claim 1, wherein the control unit is capable of ensuring that the time order for switching varies for each period of a periodic power supply signal.

4. The power supply according to claim 1, wherein the control unit is capable of ensuring that the two transistors of the same branch are switched with a dead time separating switching times of the two transistors of the same branch for the switching of the midpoint between the high and low voltages thereof, and wherein the dead time applied during the same switching on the two branches is different.

5. The power supply according to claim 4, wherein the dead times of each branch are dependent on the time order of switching of the two midpoints.

6. The power supply according to claim 1, further comprising a rectifying circuit connected between the terminals of the secondary circuit of the transformer and the output.

* * * * *